United States Patent [19]
Harada et al.

[11] Patent Number: 5,894,555
[45] Date of Patent: Apr. 13, 1999

[54] APPARATUS AND METHOD FOR MANAGING SHARED RESOURCES

[75] Inventors: Tetsuya Harada, Kawasaki; Satoru Arai, Kahoka-gun, both of Japan

[73] Assignees: Fujitsu Limited, Kawasaki; PFU Limited, Ishikawa, both of Japan

[21] Appl. No.: 08/666,932

[22] Filed: Jun. 20, 1996

[30] Foreign Application Priority Data

Jun. 23, 1995 [JP] Japan .................... 7-157452

[51] Int. Cl.$^6$ .................................................. G06F 12/00
[52] U.S. Cl. .......................... 395/200.43; 395/200.47; 711/150
[58] Field of Search ................. 395/200.43, 200.33, 395/200.47; 711/147–152

[56] References Cited

U.S. PATENT DOCUMENTS

| | | | |
|---|---|---|---|
| 4,000,485 | 12/1976 | Barlow et al. ............... | 340/172.5 |
| 4,780,821 | 10/1988 | Crossley ........................ | 395/670 |
| 5,485,607 | 1/1996 | Lomet et al. .................. | 395/600 |
| 5,535,375 | 7/1996 | Eshel et al. ................... | 395/500 |
| 5,590,326 | 12/1996 | Manabe ......................... | 395/477 |
| 5,628,005 | 5/1997 | Hurvig .......................... | 395/608 |

FOREIGN PATENT DOCUMENTS 0 518 639  12/1992  European Pat. Off. .

*Primary Examiner*—Mehmet B. Geckil
*Attorney, Agent, or Firm*—Staas & Halsey

[57] ABSTRACT

An apparatus for managing shared resources used in common by a plurality of computer systems connected together through a network, wherein an executable unit on a particular computer having the shared resources is arranged being divided into a first executable unit which requests the input/output processing unit in the resource managing unit that directly manages the shared resources to execute the process for inputting/outputting the shared resources in response to optional executable units, and a second executable unit which, by using an identifier for identifying the first executable unit, requests the locking processing unit in the resource managing unit to execute the process for locking the shared resources in response to other optional executable units substituting for said first executable unit. The invention further provides a method of managing system resources wherein the second executable unit in the apparatus for managing system resources constituted as described above executes the process for locking the shared resources to substitute for the process of the first executable unit, by using the identifier that identifies the process of the first executable unit.

10 Claims, 11 Drawing Sheets

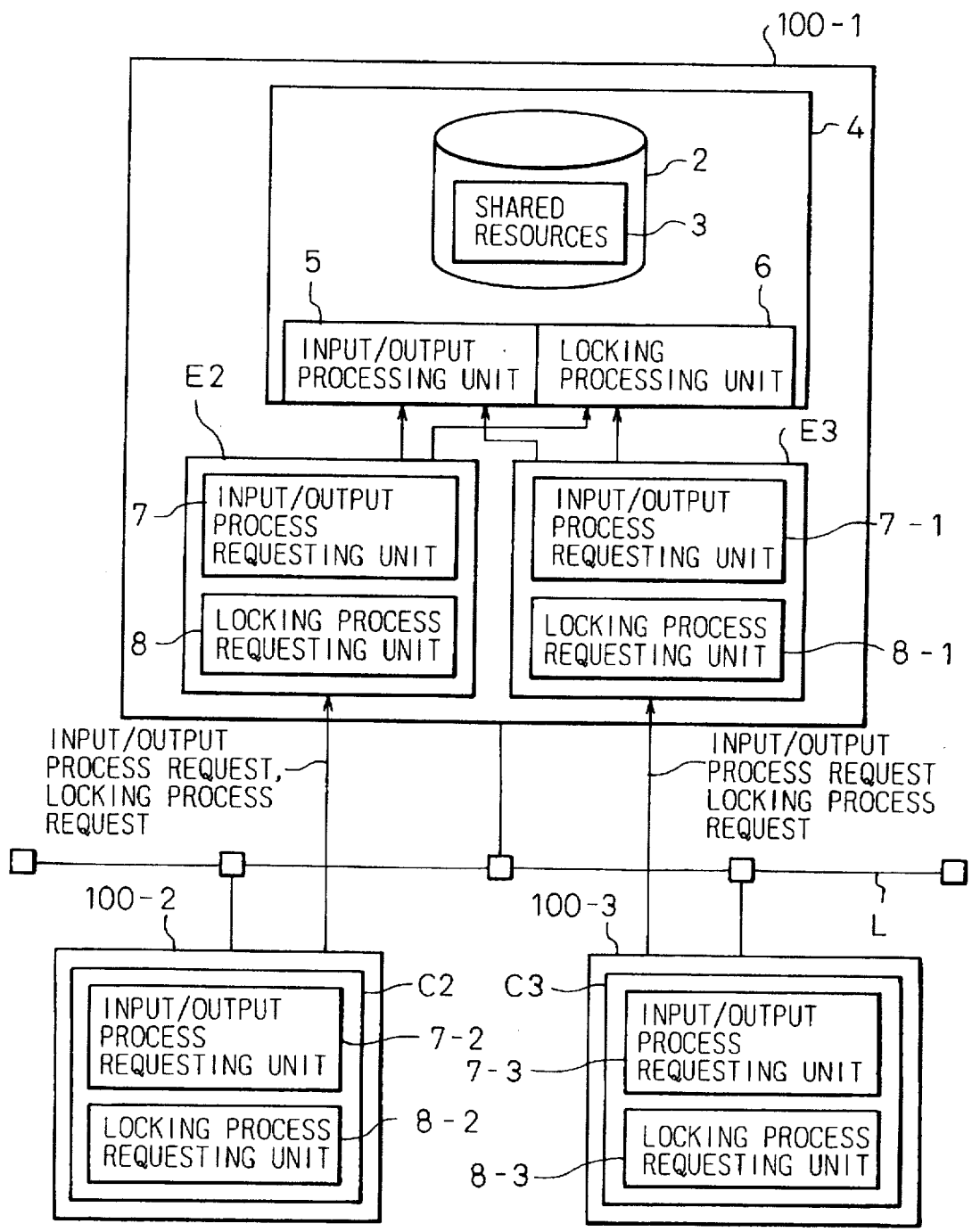

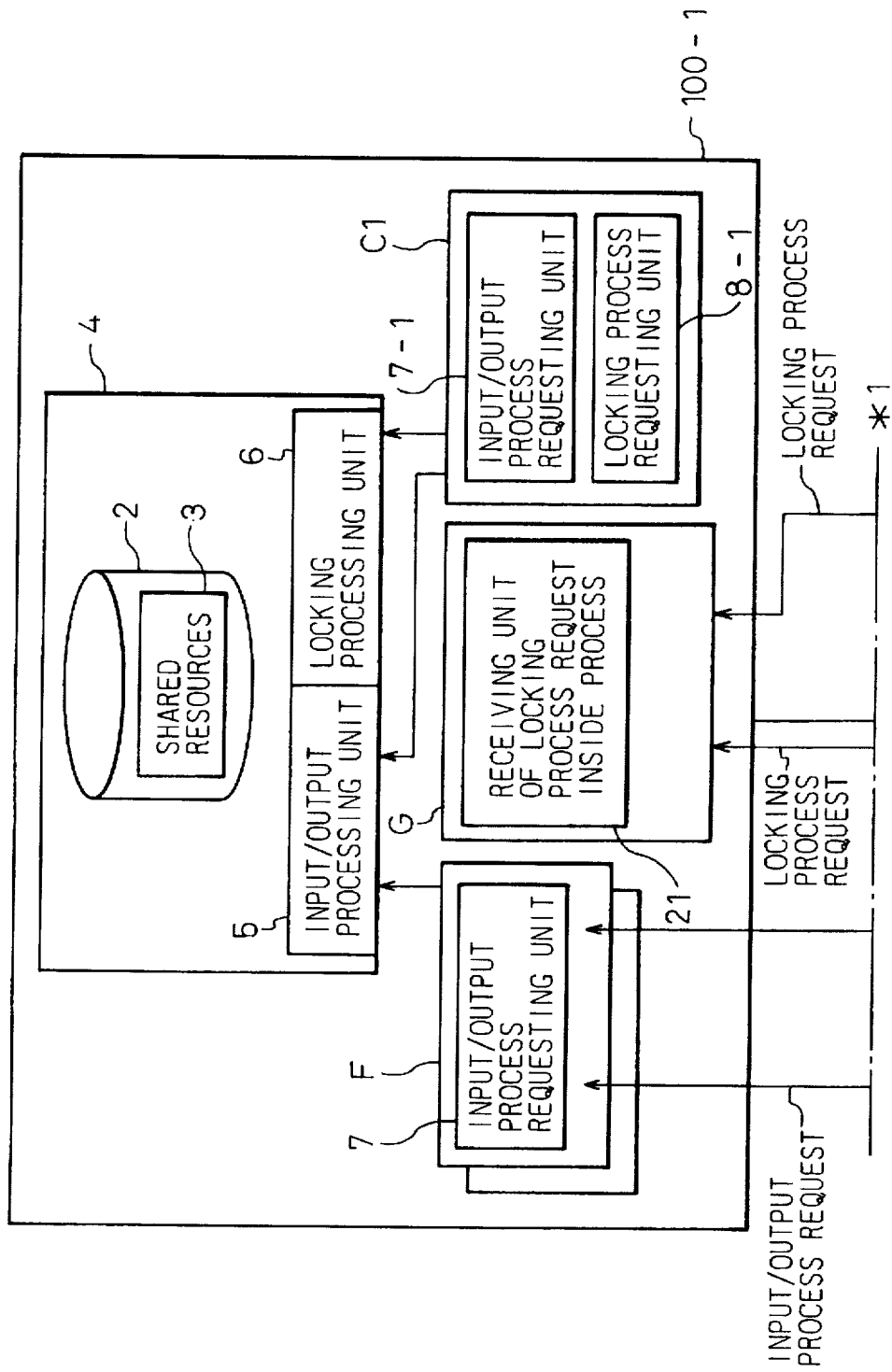

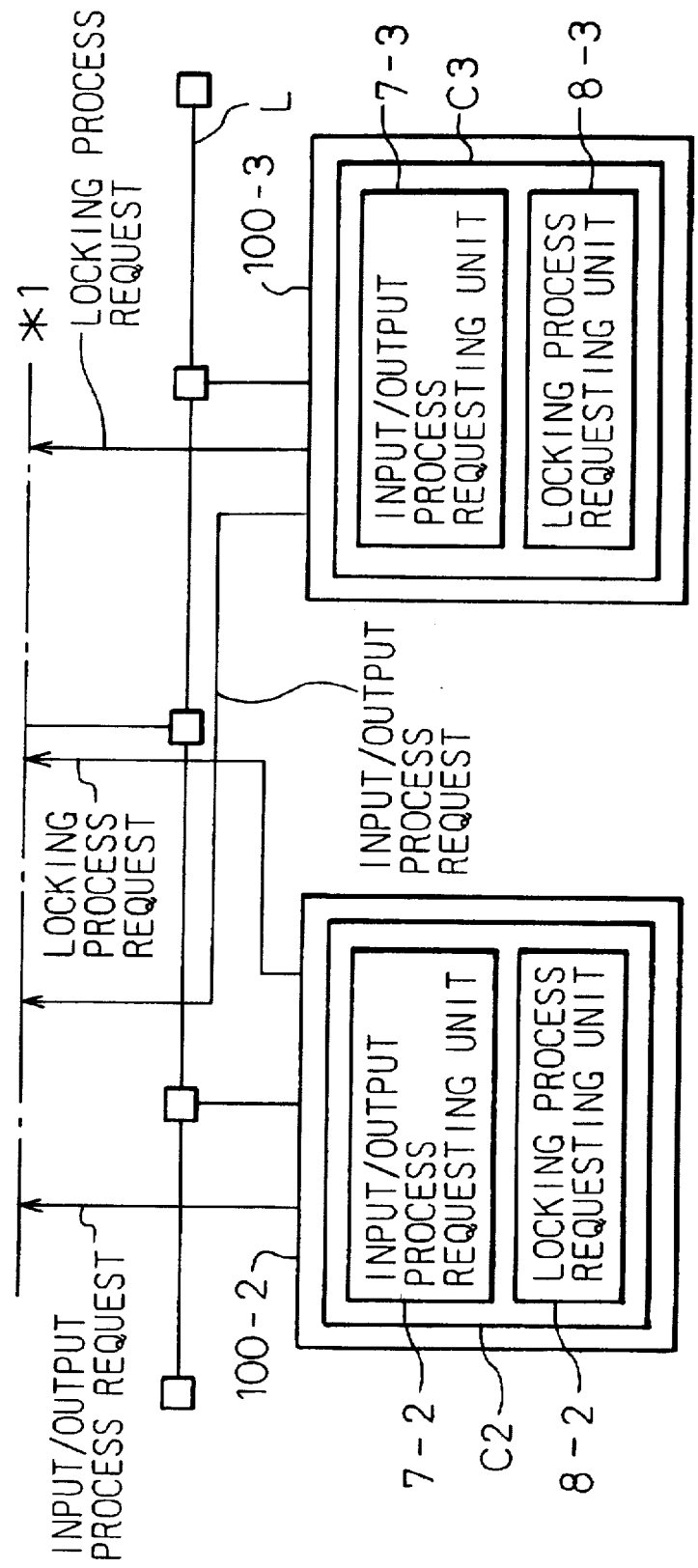

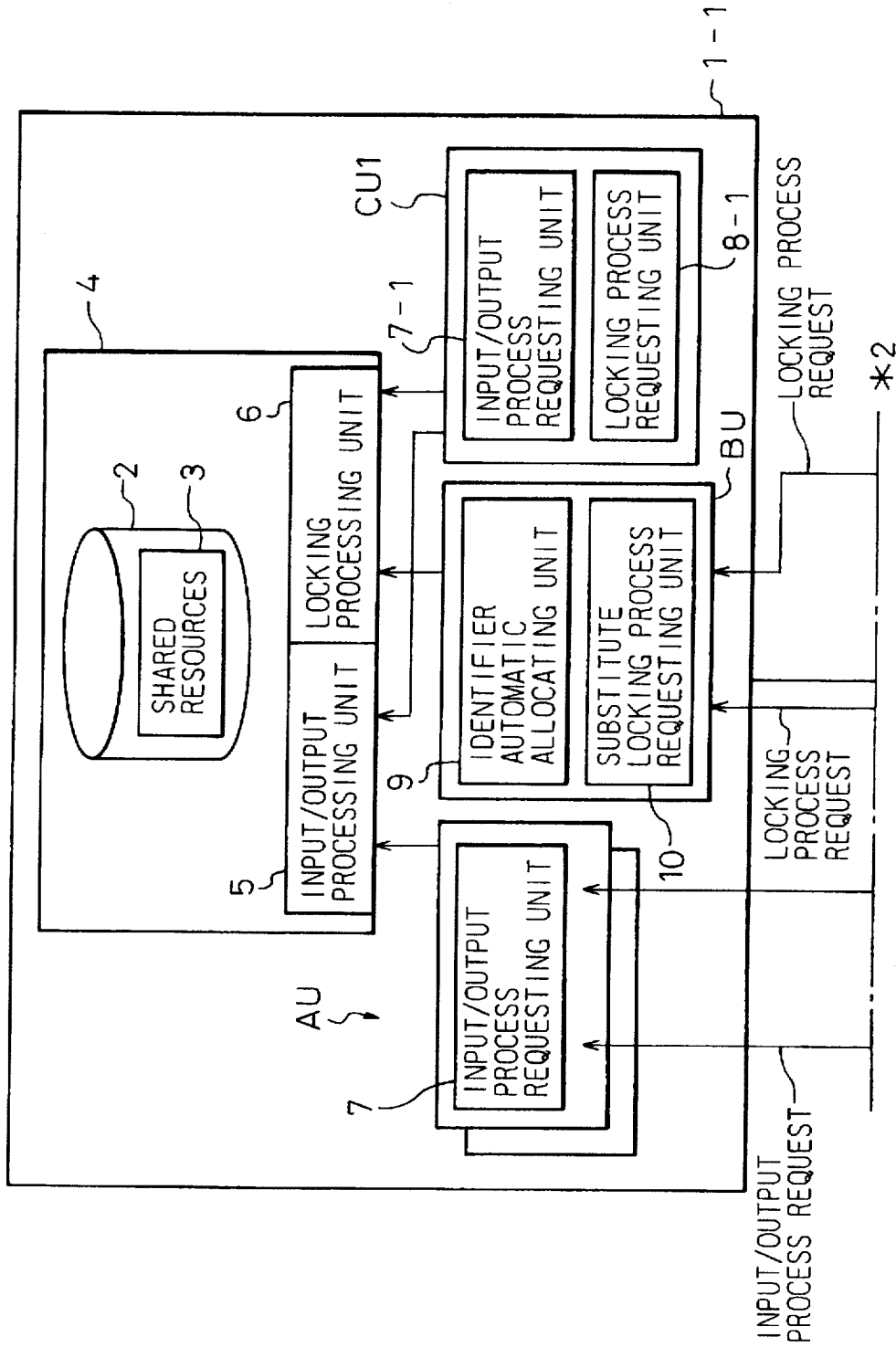

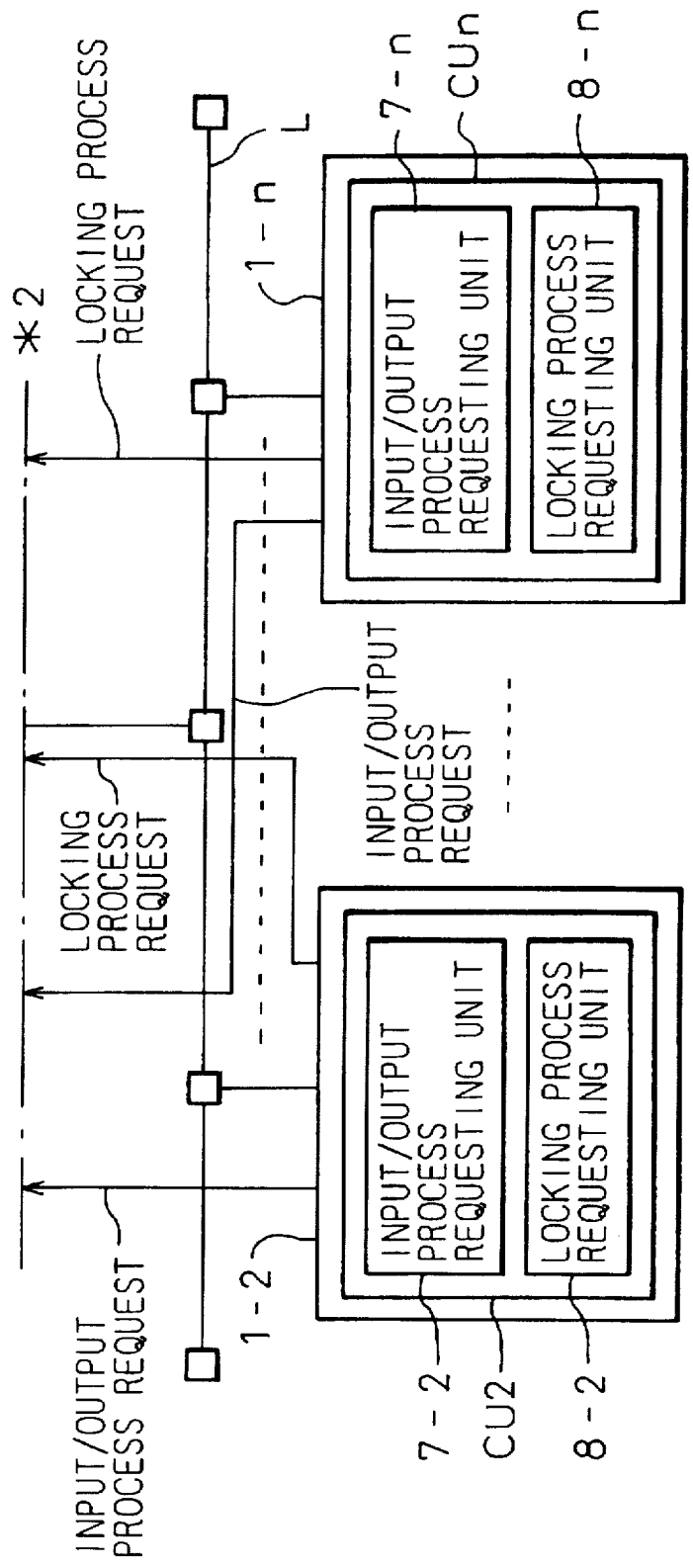

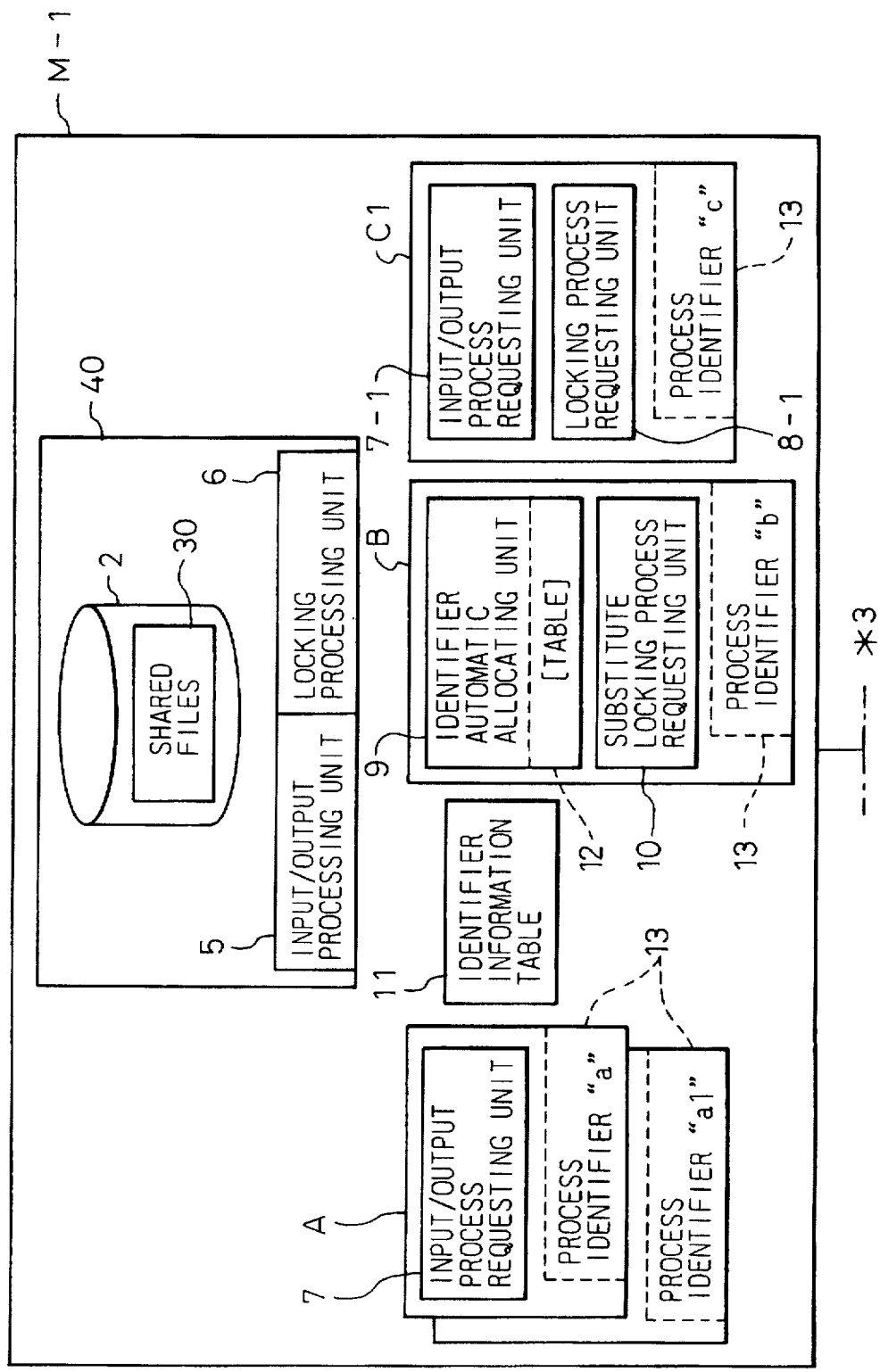

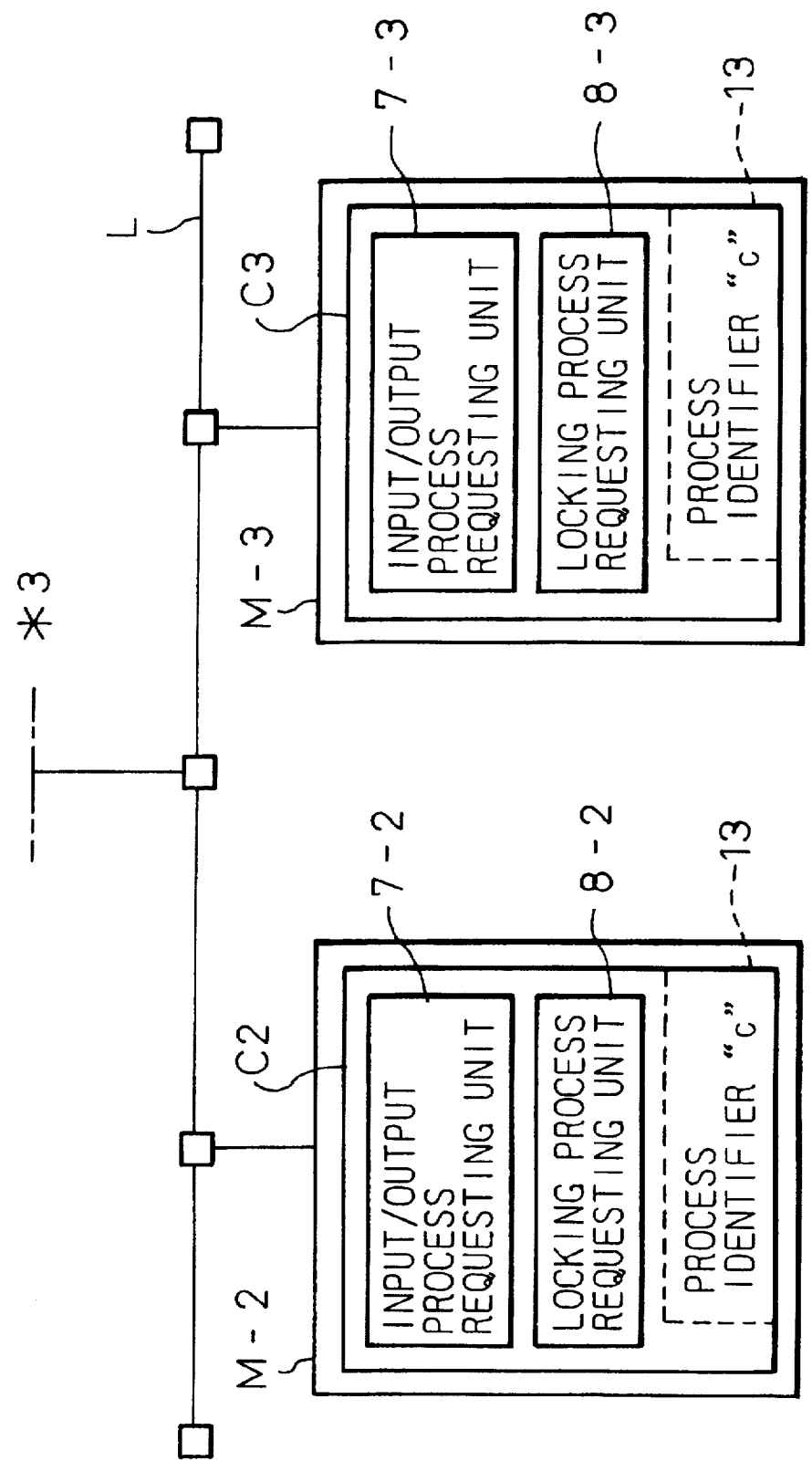

Fig. 5

| TABLE INDEX (IDENTIFIER OF EACH SHARED FILE) | PROCESS IDENTIFIER OF EACH PROCESS BY WHICH REQUEST FOR INPUT/OUTPUT PROCESS IS MADE | FILE IDENTIFIER OF EACH SHARED FILE | NAME OF EACH SHARED FILE |
|---|---|---|---|
| 1 | a | F1 | "ABCD" |
| 2 | a | F2 | "EFGH" |
| 3 | a1 | F3 | "IJKL" |
| ---- | ---- | ---- | ---- |

Fig.6

| TABLE INDEX (17) | NAME OF EACH MACHINE BY WHICH REQUEST FOR LOCKING PROCESS IS MADE (18) | PROCESS IDENTIFIER OF PROCESS BY WHICH REQUEST FOR LOCKING PROCESS IS MADE (13) | SUBSTITUTE LOCKING IDENTIFIER (19) |
|---|---|---|---|
| 1 | MACHINE M-2 | c | L1 |
| 2 | MACHINE M-3 | c | L2 |
| 3 | MACHINE M-2 | d | L3 |
| ---- | ---- | ---- | ---- |

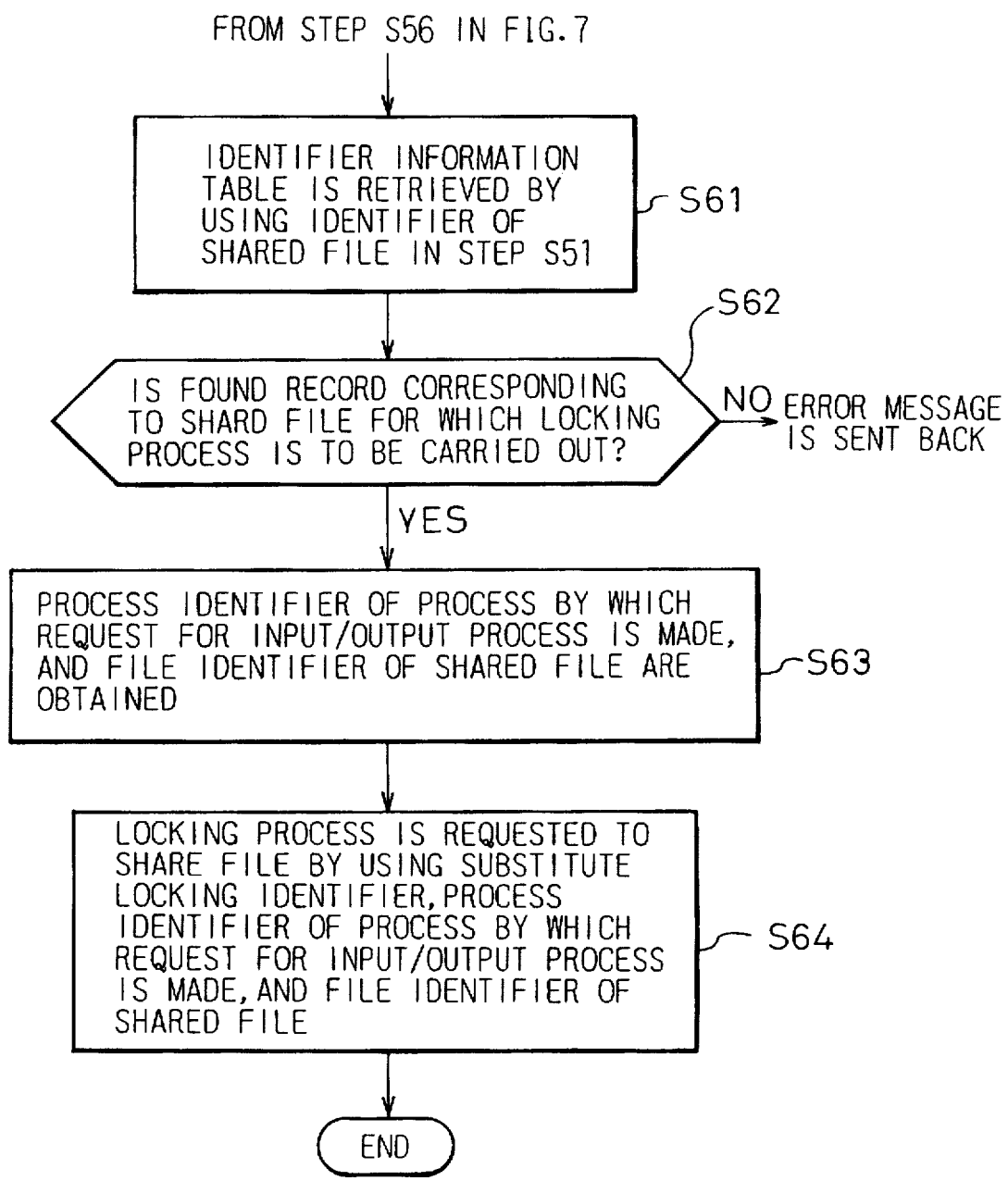

APPARATUS AND METHOD FOR MANAGING SHARED RESOURCES

BACKGROUND OF THE INVENTION

1. Field of the Invention

The present invention relates to an apparatus and a method for managing shared system resources provided in a particular computer system among a plurality of computer systems connected together through a network such as LAN (local area network).

More specifically, when the above-mentioned computer system consists of a plurality of machines including a variety of executable units (here, the executable units include processes, jobs, etc.) for executing input/output processes and editing, the invention relates to a method of clarifying the use of shared system resources (hereinafter referred to as shared resources) among these machines, e.g., refers to a method of clarifying the use of shared files in a data storage unit by an executable unit in a given machine, in order to efficiently execute the process for locking the shared files.

Here, the locking process stands for inhibiting access to the shared files by other executable units by clarifying the fact that a given executable unit is now using part or all of the shared files, in order to prevent the contents of the shared files from being destroyed when the shared files provided in a given machine are simultaneously accessed by two or more executable units in other machines.

2. Description of the Related Art

Here, problems inherent in a conventional method of managing system resources will be described with reference to FIGS. 1 to 2B together with the constitution (i.e., structure) and operation of a conventional apparatus for managing system resources.

FIGS. 1, 2A and 2B are diagrams illustrating the constitution of a conventional apparatus for managing system resources. More specifically, FIG. 1 is a block diagram illustrating a first example of a conventional apparatus for managing system resources, and FIGS. 2A and 2B are block diagrams illustrating the former half portion and the latter half portion of a second example of a conventional apparatus for managing system resources. Here, in particular, these drawings illustrate the constitution of the device for managing the input/output process and the locking process of the shared resources such as shared files that are used in common by a plurality of executable units on a plurality of computer systems.

In FIGS. 1 to 2B, a plurality of computer systems are represented by computer systems 100-1, 100-2 and 100-3 corresponding to three kinds of machines, which are connected together through a network L such as LAN or the like. Among these computer systems, a particular computer system (e.g., computer system 100-1) is provided with a data storage unit 2 which may be a disk device or the like device for storing data in advance. The data storage unit 2 in the computer system 100-1 is shared by other computer systems 100-2 and 100-3 through the network L.

In further detail, the data storage unit 2 includes shared resources 3 such as shared files that can be used in common by various executable units of the plurality of computer systems 100-1, 100-2 and 100-3. The input/output process and the locking process for the shared resources 3 in the data storage unit 2 are executed by sending a request to an input/output processing unit 5 or to a locking processing unit 6 provided in a resource managing unit (e.g., file managing unit) 4 that has a function for managing the shared resources 3 in the computer system 100-1.

In the first conventional constitution shown in FIG. 1, the computer system 100-1 contains processes E2 and E3 which are executable units, the computer system 100-2 contains a process C2 which is an executable unit, and the computer system 100-3 contains a process C3 which is an executable unit.

An input/output process requesting unit 7 and a locking process requesting unit 8 in the process E2 request the input/output processing unit 5 and the locking processing unit 6 in the shared resource managing unit 4 in the computer system 100-1 to which the process E2 belongs to execute the input/output process for the shared resources 3 and to execute the process for locking the shared resources 3. Furthermore, the input/output processing unit 5 and the locking processing unit 6 in the shared resource managing unit 4 receive, from the input/output process requesting unit 7-2 and the locking process requesting unit 8-2 in the process C2 in the computer system 100-2, the requests for executing the input/output process and the locking process for the shared resources 3.

Similarly, an input/output process requesting unit 7-1 and a locking process requesting unit 8-1 in the process E3 request the input/output processing unit 5 and the locking processing unit 6 in the shared resource managing unit 4 in the computer system 100-1 to which the process E3 belongs to execute the input/output process for the shared processes 3 and the process for locking the shared resources 3. Furthermore, the input/output processing unit 5 and the locking processing unit 6 in the shared resource managing unit 4 receive, from the input/output requesting unit 7-3 and the locking process requesting unit 8-3 in the process C3 in the computer system 100-3, the requests for executing the input/output process for the shared resources 3 and the process for locking the shared resources 3.

According to the system resource managing apparatus of FIG. 1 as described above, requests for input/output process and locking process for the shared resources 3 from other computer systems (e.g., computer systems 100-2, 100-3) are accepted using processes (e.g., processes E2, E3) in the computer system 100-1 in which the shared resources 3 exist, the processes corresponding to the processes (e.g., processes C2, C3) of other computer systems.

Next, in the second conventional constitution shown in FIGS. 2A and 2B, the computer system 100-1 (FIG. 2A) contains a process F, a process G and a process C1 which are executable units, the computer system 100-2 (FIG. 2B) contains a process C2 as in the case of FIG. 1, and the computer system 100-3 (FIG. 2B) contains a process C3 as in the case of FIG. 1. Here, the number of the process F in the computer system 100-1 may be one or more.

In FIGS. 2A and 2B, the process F in the computer system 100-1 receives requests for input/output process for the shared resources 3 sent from an input/output process requesting unit 7-2 of the process C2 and from an input/output process requesting unit 7-3 of the process C3 through the network L. Furthermore, the input/output process requesting unit 7 in the process F requests the resource managing unit 4 to execute the input/output process for the shared resources 3.

Moreover, the process G in the computer system 100-1 of FIG. 2A receives requests for locking the shared resources 3 that are sent from a locking process requesting unit 8-2 in the process C2 of FIG. 2B and from a locking process requesting unit 8-3 in the process C3 through the network L.

Besides, the process G does not request the resource managing unit 4 in the computer system 100-1 to lock the shared resources 3, but executes exclusive control inside the process G only by using a unit 21 that receives requests for locking processes inside the process G (i.e., a receiving unit 21 of locking process requests inside the process G).

However, when the input/output process and locking process for the shared resources 3 are realized as a single executable unit, for example, as a single process as in the first conventional example (FIG. 1), it is not allowed to execute the input/output process and the locking process in parallel, and the processing efficiency decreases in the computer system. Moreover, since the process for the request of input/output process and the process for the request of locking process are executed through the single process, there occurs a problem in that the structure of the system resource managing apparatus becomes complex.

As shown in FIGS. 2A and 2B, furthermore, when the process F for receiving the request for input/output process for the shared resources 3 and the process G for receiving the request for locking process are divided into independent processes in order to execute the exclusive control by the process G only, the request of locking process for the shared resources 3 is not sent to the resource managing unit 4. Therefore, a problem arises in that the request for locking process is invalidated among the process C1 in the computer system 100-1, the process C2 in the computer system 100-2, and the process C3 in the computer system 100-3.

It can be contrived that the locking process requesting unit (not shown in FIG. 2A) of the process G requests the resource managing unit 4 to execute the locking process upon receiving the request for locking process from the locking process requesting unit 8-2 of the process C2 in the computer system 100-2, so that the request for locking process is validated with respect to the process C1 in the computer system 100-1. In this case, however, the request for locking process by the process G limits the request for input/output process sent to the resource managing unit 4 from the input/output process requesting unit 7 of the process F depending upon the request for input/output process from the input/output process requesting unit 7-2 of the process C2. If it is attempted to avoid the limitation on the request for input/output process of the process F, then, the process G becomes no longer capable of sending to the resource managing unit 4 the request for locking process for the shared resources 3. As a result, there still remains a problem in that the request for locking process is invalidated among the process in the computer system 100-1, and processes C2 and C3 in other computer systems 100-2, 100-3.

SUMMARY OF THE INVENTION

The present invention was accomplished in view of the above-described problems, and its object is to provide an apparatus for managing system resources which is capable of efficiently executing the input/output process and the locking process for shared resources without limiting the requests for input/output process sent from, other executable units that execute input/output processes for the shared resources after a request for locking the shared resources such as shared files is sent from an executable unit such as a process that exists on a plurality of computer systems, and without causing the structure of the apparatus to become complex despite receiving both the request for input/output process and the request for locking process, as well as to provide a method of managing system resources.

In order to solve the above-mentioned problems, an apparatus for managing system resources of the present invention comprises a resource managing unit which is provided in a particular computer system among a plurality of computer systems connected to a network in order to directly manage shared resources that are used in common by a plurality of executable units on the plurality of computer systems, the resource managing unit including an input/output processing unit for executing the input/output process for the shared resources concerning optional executable units and a locking processing unit for executing the process for locking the shared resources concerning other optional executable units, wherein a processing means (i.e., executable unit) on the particular computer system is arranged so as to be divided into a first executable unit including an input/output process requesting unit which requests the input/output processing unit to execute the input/output process for the shared resources in response to optional executable units on the computer systems, and a second executable unit including a substitute locking process requesting unit which, by using an identifier for identifying the first executable unit, requests the locking processing unit to execute the process for locking the shared resources substituting for the first executable unit.

Preferably, an apparatus for managing system resources of the invention has a feature in that the identifier comprises an executable unit identifier capable of uniquely identifying the first executable unit in the particular computer system and a file identifier capable of uniquely identifying the shared resources relying on the first executable unit, and that the second executable unit requests the process for locking the shared resources by using the executable unit identifier and the file identifier.

More preferably, an apparatus for managing system resources of the invention has a feature in that the process for locking the shared resources comprises designating the offset and length in the shared resources to thereby lock the shared resources and inhibiting access by other executable units to the locked region.

More preferably, an apparatus for managing system resources of the invention has a feature in that the process for locking the shared resources comprises inhibiting access by other executable units to the whole shared resources in response to a designation for opening the shared resources.

More preferably, an apparatus for managing system resources of the invention has a feature in that when there are a plurality of the first executable units that request the input/output process for the shared resources, the second independent executable unit requests the locking process substituting for all first executable units.

More preferably, an apparatus for managing system resources of the invention has a feature in that in order to receive requests for locking the shared resources from the executable units on a plurality of other computer systems, the second executable unit further includes an automatic identifier allocating unit to automatically allocate virtual identifiers to the requests for locking from the executable units on the other computer systems, and the second executable unit requests the process for locking the shared resources by using virtual identifiers automatically allocated to the requests for locking process from the other computer systems, in order to execute exclusive control among the optional executable units in all computer systems.

The present invention is further concerned with a method of managing system resources for executing the input/output process and the locking process for the shared resources in a data storage unit that is provided in a particular computer system among a plurality of computer systems connected to a network, and is used in common by a variety of processes on the plurality of computer systems, wherein the process on the particular computer system is divided into a first process for processing the requests the input/output process of the shared resources sent from the optional processes on the plurality of computer systems and a second process for processing the requests for locking the shared resources, and the process for locking the shared resources is executed by the second process based upon an identifier that identifies the first process to substitute for the first process.

Preferably, a method of managing system resources of the invention has a feature in that the process for locking the shared resources is executed by using, as the identifier, a process identifier capable of uniquely identifying the first process in the particular computer system and a file identifier capable of uniquely identifying the shared resources in the data storage unit relying upon the first process.

More preferably, a method of managing system resources of the invention has a feature in that the process for locking the shared resources comprises designating the offset and length in the shared resources to thereby lock the shared resources and inhibiting access by other processes to the locked region.

More preferably, a method of managing system resources of the invention has a feature in that the process for locking the shared resources comprises inhibiting access by other processes to the whole shared resources in response to a designation for opening the shared resources.

More preferably, a method of managing system resources of the invention has a feature in that when there are a plurality of the first processes that execute the input/output process for the shared resources, the second independent process executes the locking processing substituting for all first processes.

More preferably, a method of managing system resources of the invention has a feature in that in order to receive requests for locking the shared resources from a plurality of other computer systems, the second process automatically allocates virtual identifiers to the requests for the locking process sent from the processes on the other computer systems, and the process is executed for locking the shared resources by using the thus allocated virtual identifiers, in order to execute exclusive control among the optional processes in all computer systems.

According to the method of managing system resources of the present invention, the second executable unit on a particular computer system having shared resources requests the shared resource managing unit to lock the shared resources by using the executable unit identifier of the first executable unit instead of using the identifier of the second executable unit, so that it appears that the first executable unit has requested the locking process. Even after the second executable unit has requested the process for locking the shared resources, therefore, the first executable unit is not affected with regard to its input/output process for the shared resources that have been locked.

Moreover, since the second executable unit is practically requesting the resource managing unit to lock the shared resources, the request for locking process is validated among the executable unit in the particular computer system and the executable units in other computer systems.

Furthermore, the second executable unit requests the resource managing unit to lock the shared resources by using virtual substitute locking identifiers that are automatically allocated to the requests for the locking process by the executable units of other computer systems. This makes it possible to execute the requests for the locking process among the executable unit on the computer system and the executable units on other computer systems and to execute the exclusive control among the executable units on all computer systems.

According to the present invention as described above, the executable unit is divided into the first executable unit for receiving the request of input/output process for the shared resources and the second executable unit for receiving the request for the locking process. Therefore, no limitation is imposed on the requests from other executable units for the input/output process for the shared resources even after the request for locking the shared resources is made by the second executable unit. By independently executing the requests for the input/output process and the requests for the locking process from different executable units on the computer systems, furthermore, the burden born by the executable units can be reduced, and the input/output process and locking process for the shared resources can be efficiently executed even by using an apparatus of a constitution simpler than that of the prior art.

Besides, since the executable unit on a computer system requests the resource managing unit of the same computer system to lock the shared resources, the requests for the locking process are validated among the executable units of all computer systems making it possible to execute exclusive control by the request of locking process among the executable unit on a computer system having the shared resources and the executable units on other computer systems connected to the network.

BRIEF DESCRIPTION OF THE DRAWINGS

The above objects and features of the present invention will become more apparent from the following description of some preferred embodiments with reference to the accompanying drawings, wherein:

FIG. 1 is a block diagram illustrating a first example of a conventional apparatus for managing system resources;

FIG. 2A is a block diagram illustrating the former half portion of a second example of a conventional apparatus for managing system resources;

FIG. 2B is a block diagram illustrating the latter half portion of the second example of the conventional apparatus for managing system resources;

FIG. 3A is a block diagram illustrating the constitution of the former half portion of an embodiment which is based upon a basic principle of the present invention;

FIG. 3B is a block diagram illustrating the constitution of the latter half portion of the embodiment based upon the basic principle of the present invention;

FIG. 4A is a block diagram illustrating the constitution of the former half portion of an apparatus for managing system resources according to a preferred embodiment of the present invention;

FIG. 4B is a block diagram illustrating the constitution of the latter half portion of the apparatus for managing system resources according to the preferred embodiment of the present invention;

FIG. 5 is a diagram illustrating an identifier information table used in the preferred embodiment of the present invention;

FIG. 6 is a diagram illustrating an automatic identifier allocating table used in the preferred embodiment of the present invention;

FIG. 8 is a flow chart for explaining the operation of a substitute locking process requesting unit of FIG. 4A.

DESCRIPTION OF THE PREFERRED EMBODIMENTS

Figure 7:
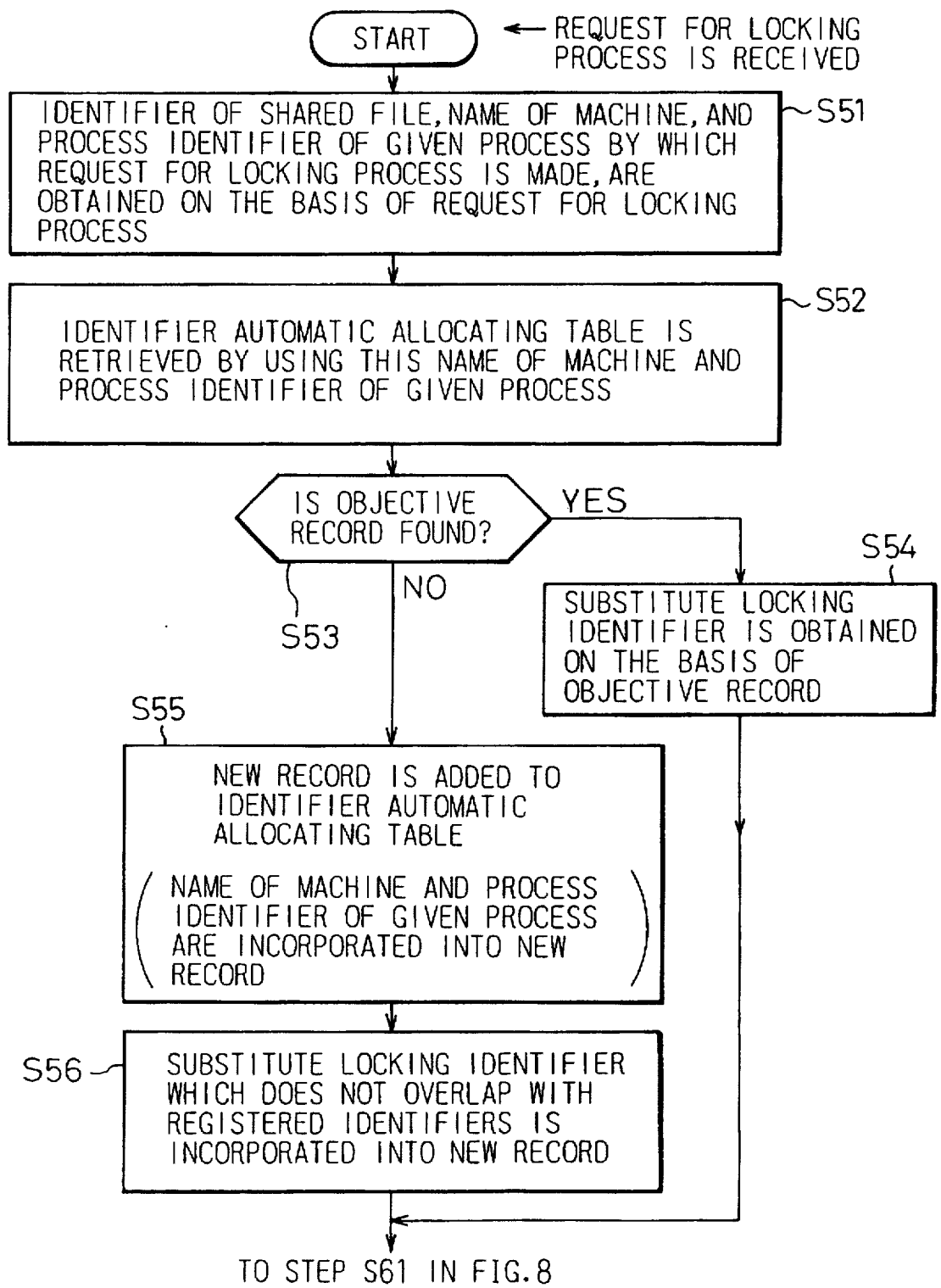
FIG. 7 is a flow chart for explaining the operation of an automatic identifier allocating unit of FIG. 4A.

Hereinafter, the description of some preferred embodiments according to the present invention will be given with reference to the accompanying drawings.

FIGS. 3A and 3B are block diagrams illustrating the constitutions of the former half portion and the latter half portion of an embodiment based upon a basic principle of the present invention. Hereinafter, the same constituent elements as those described above are denoted by the same reference numerals.

An apparatus for managing system resources of the embodiment has a resource managing unit 4 provided in a particular computer system 1-1 among a plurality of computer systems 1-1, 1-2, - - -, 1-n (n is a given positive integer) connected to a network L as in the conventional apparatus for managing resources (FIGS. 1 to 2B). The resource managing unit 4 works to directly manage shared resources 3 used in common by a plurality of executable units on the plurality of computer systems 1-1, 1-2, - - -, 1-n. As in the prior art, the resource managing unit 4 includes an input/output processing unit 5 for inputting/outputting the shared resources 3 for optional executable units and a locking processing unit 6 for locking the shared resources 3 for other optional executable units.

Referring to FIG. 3A, furthermore, a processing unit, i.e., an executable unit on the particular computer system 1-1 in the apparatus for managing system resources of the present invention is arranged so as to be divided into a first executable unit AU including an input/output process requesting unit 7 that sends the requests from the optional executable units on the computer systems 1-1, 1-2, - - -, 1-n to the input/output processing unit 5 to execute the input/output process for the shared resources 3, and a second executable unit BU including a substitute locking process requesting unit 10 which, by using the identifier for identifying the first executable unit AU, requests the locking processing unit 6 to lock the shared resources 3 substituting for the first executable unit AU.

Furthermore, the identifier used for the apparatus for managing system resources shown in FIGS. 3A and 3B comprises an executable unit identifier capable of uniquely identifying the first executable unit AU in the computer system 1-1 and a file identifier capable of uniquely identifying the shared resources 3 relying upon the first executable unit AU. By using the executable unit identifier and the file identifier, the second executable unit BU requests the process for the shared resources 3.

In the apparatus for managing system resources of the invention shown in FIGS. 3A and 3B, furthermore, the locking process for the shared resources 3 locks the shared resources 3 by designating the offset and the length in the shared resources 3, and inhibits access by other executable units to the locked region.

In the apparatus for managing system resources shown in FIGS. 3A and 3B, furthermore, the locking process for the shared resources 3 inhibits access by other executable units (e.g., executable unit CU1 which closely corresponds to the executable unit such as process C1 in FIG. 2A) to the whole shared resources 3 in response to a designation for opening the shared resources 3.

In the apparatus for managing system resources shown in FIGS. 3A and 3B, furthermore, when there exist a plurality of first executable units AU that request input/output process for the shared resources 3, the second independent executable unit BU requests the locking process substituting for all first executable units AU.

In the apparatus for managing system resources shown in FIGS. 3A and 3B, furthermore, in order to receive requests of the locking process for the shared resources 3 from the executable units (e.g., executable units CU2 to CUn which closely correspond to executable units such as processes C2, C3 of FIG. 1 or 2) on the computer systems 1-2 to 1-n other than the particular computer system 1-1, the second executable unit BU is further equipped with an automatic identifier allocating unit 9 for automatically allocating virtual identifiers to the requests for the locking process from the processing units of other computer systems 1-2 to 1-n. By using virtual identifiers automatically allocated to the requests for the locking process from the other computer systems 1-2 to 1-n, the second executable unit BU requests the locking process for the shared resources 3 in order to execute exclusive control among the optional executable units (e.g., among the executable unit CU1 and the executable units CU2 to CUn) on all computer systems 1-1, 1-2, - - -, 1-n.

The present invention is further concerned with a method of managing system resources that is executed by the apparatus for managing system resources shown in FIGS. 3A and 3B, in order to execute the input/output process and the locking process for the shared resources in the data storage unit which is provided in a particular computer system among the plurality of computer systems connected to the network and is used in common by a variety of processes (i.e., a variety types of processings executed by the executable units such as processes) in the plurality of computer systems.

In the method of managing system resources according to the embodiment of the present invention, the process on the particular computer system is divided into a first process for processing the input/output process for the shared resources for the optional processes on the plurality of computer systems, and a second process for processing the request for locking the shared resources. By using the identifier for identifying the first process, furthermore, the second process executes the process for locking the shared resources substituting for the first process.

In the method of managing system resources according to the embodiment of the present invention, furthermore, the process for locking the shared resources is executed by using, as the above-mentioned identifiers, a process identifier (used nearly in the same meaning as the above-mentioned executable unit identifier) capable of uniquely identifying the first process in the particular computer system and a file identifier capable of uniquely identifying the shared resources in the data storage unit based upon the first process.

In the method of managing system resources according to the embodiment of the present invention, furthermore, the process for locking the shared resources locks the shared resources by designating the offset and the length in the shared resources, and inhibits access by other processes to the locked region.

In the method of managing system resources according to the embodiment of the present invention, furthermore, the process for locking the shared resources inhibits access by other processes to the whole shared resources in response to a designation for opening the shared resources.

In the method of managing system resources according to the embodiment of the present invention, furthermore, when there exist a plurality of first processes that execute the input/output process for the shared resources, the second independent process executes the locking process substituting for all first processes.

In the method of managing system resources according to the embodiment of the present invention, furthermore, in order to receive requests for locking the shared resources from the processes on the computer systems other than the particular computer system, the second process automatically allocates virtual identifiers to the requests for the locking process from the processes on other computer systems and executes the process for locking the shared resources by using the thus allocated virtual identifiers in order to execute exclusive control among the optional processes in all computer systems.

In further detail, the first executable unit AU for receiving the request for input/output process for the shared resources 3 on the computer system 1-1, and the second executable unit BU for receiving the request for locking the shared resources 3, are disposed so as to be divided into independent executable units in order to efficiently receive the requests for input/output process for the shared resources 3 from computer systems 1-2 to 1-n, other than the particular computer system 1-1 having the shared resources 3, in parallel with the reception of the requests for the locking process. Here, the first executable units AU may be made present in a plural number in the computer system 1-1 to receive in parallel the requests for input/output process for the shared resources 3 from the plurality of other computer systems 1-2 to 1-n. It is, however, necessary that only a single second executable unit BU be present in the computer system 1-1 from the standpoint of locking process.

The first executable unit AU receives the requests for input/output processing the shared files 3 from the input/output process requesting units 7-2 to 7-n of the executable units in other computer systems 1-2 to 1-n, and requests, from its input/output process requesting unit 7, the resource managing unit 4 to execute the input/output process for the shared resources 3.

Furthermore, the second executable unit BU receives the requests for locking the shared resources 3 from the locking process requesting units 8-2 to 8-n of the executable units in other computer systems 1-2 to 1-n, and requests, from its locking process requesting unit 8, the resource managing unit 4 to lock the shared resources 3.

In this case, however, the second executable unit BU requests, from its substitute locking process requesting unit 10, the resource managing unit 4 to lock the shared resources 3 by using a file identifier of the shared resources 3 that are to be locked and using, as an executable unit identifier, the executable unit identifier of the first executable unit AU instead of using the identifier of the second executable unit BU. In this case, when the first executable units AU exist in a plural number, the second executable unit BU uses process identifiers of the first executable units AU corresponding to the executable units of other computer systems that have requested the locking process.

In other words, the second executable unit BU requests the resource managing unit 4 to lock the shared resources 3 by using the executable unit identifiers of the first executable units AU instead of using the identifier of the second executable unit BU itself. Therefore, the resource managing unit 4 so regards that the first executable units AU have requested the locking process, and executes the process for locking the shared resources 3.

While the second executable unit BU is receiving the requests for the locking process from the executable units of other plurality of computer systems, the automatic identifier allocating unit 9 in the second executable unit BU automatically allocates virtual identifiers (e.g., substitute locking identifiers) to the requests for the locking process from the executable units of other computer systems. Besides, the resource managing unit 4 is requested to lock the shared resources 3 by using the substitute locking identifiers in addition to using the executable unit identifiers of the first executable units AU and the file identifiers of the shared resources 3 that are to be locked.

According to the apparatus and method for managing system resources of the basic embodiment of the present invention as described above, the second executable unit BU on the particular computer system 1-1 having the shared resources 3 requests resource managing unit 4 to lock the shared resources 3 by using the executable unit identifiers of the first executable units AU on the computer system 1-1 instead of using the identifier of the second executable unit BU itself, so that it appears that the first executable unit AU has requested the locking process. Even after the second executable unit BU has requested the locking process for the shared resources 3, therefore, the first executable unit AU is not affected with regard to its input/output process for the shared resources 3 that have been locked.

In practice, furthermore, the second executable unit BU requests the resource managing unit 4 to lock the shared resources 3 and, hence, the request for the locking process is validated among the other executable unit CU1 in the particular computer system 1-1 and the executable units CU2 to CUn in other computer systems 1-2 to 1-n.

Furthermore, the second executable unit BU requests the resource managing unit 4 to lock the shared resources 3 by using virtual substitute locking identifiers that are automatically allocated to the requests for locking process from the executable units CU2 to CUn on the other computer systems 1-2 to 1-n. Therefore, the request for locking process is validated among the executable unit C1 on the computer system 1-1 and the executable units CU2 to CUn on the other computer systems 1-2 to 1-n, enabling the exclusive control to be executed among optional executable units in all computer systems.

Summarizing, according to the preferred embodiment of the present invention, the first executable unit for receiving the request for input/output process for the shared resources and the second executable unit for receiving the request for locking process are divided into independent executable units, and the second executable unit requests the locking process substituting for the first executable unit. After the process for locking the shared resources is requested by the second executable unit, therefore, the request for input/output processing the shared resources is not limited by other executable units that execute the input/output processing for the shared resources. By independently receiving the requests for the input/output process and the requests for the locking process from different executable units on the computer systems, furthermore, it is allowed to reduce the burden born by the executable units. It is therefore allowed to efficiently execute the input/output process and the locking process for the shared resources even by using an apparatus of a constitution simpler than that of the prior art.

Moreover, since the executable unit on a computer system requests the resource managing unit of the same computer system to lock the shared resources, the request for the locking process is validated among the optional executable units on all computer systems, and the exclusive control based on the request for locking process can be executed among the executable units on the computer system having shared resources and the executable units on other computer systems connected to the network.

FIGS. 4A and 4B are block diagrams illustrating the constitutions of the former half portion and the latter half portion of the apparatus for managing system resources according to a preferred embodiment of the present invention; FIG. 5 is a diagram illustrating an identifier information table used in the preferred embodiment of the present invention; and FIG. 6 is a diagram illustrating an automatic identifier allocating table used in the preferred embodiment of the present. invention. This embodiment deals with a case where three kinds of machines M-1, M-2 and M-3 are connected to the network L as a plurality of computer systems 1-1 to 1-n (FIG. 3). In this embodiment, furthermore, processes are used as executable units.

In FIGS. 4A and 4B, the three kinds of machines M-1, M-2 and M-3 are so constituted as to accomplish communication with each other via a network L. A data storage unit of the machine M-1 corresponding to the particular computer system is equipped with shared files 30 which are shared resources 3. The shared files 30 can be accessed through the input/output processing unit 5 or the locking processing unit 6 in a file managing unit, 40 that works as a resource managing unit (see FIG. 3A). That is, the shared files 30 in the data storage unit, 2 provided in the machine M-1 are used in common by other machines M-2 and M-3 through the network L.

In FIGS. 4A and 4B, the machine M-1 includes a first process A (the first executable unit AU of FIG. 3A), a second process B (the second executable unit BU of FIG. 3A) and another process C1 (another executable unit CU1 of FIG. 3), and the machines M-2 and M-3 include a process C2 and a process C3 (other executable units CU2 and CU3 of FIG. 3B), respectively.

Like in the case of FIGS. 3A and 3B, the first process A is provided with the input/output process requesting unit 7, and the second process B is provided with the automatic identifier allocating unit 9 and the substitute locking process requesting unit 10. Moreover, the processes C1 to C3 are provided with input/output. process requesting units 7-1 to 7-3 and locking process requesting units 8-1 to 8-3.

The above-mentioned processes have a process identifier (executable unit identifier) 13 capable of uniquely identifying the process in the machine. If described in more detail, the first process A has a process identifier "a", the second process B has a process identifier "be", and the processes C1, C2 and C3 have a process identifier "c", respectively. These process identifiers 13 are effective in only those machines in which are present the processes corresponding to these process identifiers. The identifier information table 11 exists in a shared region of the first process A and the second process B, and can be accessed from either the first process A or the second process B.

The process C2 in the machine M-2 that is going to utilize the shared file 30 in the data storage unit 2 of the machine M-1, sends a request to the first process A on the machine M-1 through the network L to open the shared files 30. Thus, the process C2 requests the shared file identifier 14 (see FIG. 5) of the shared files 30 that are to be used.

Upon receiving the above request, the first process A seeks the shared files 30 to be used by the process C2 out of the identifier information table 11 of FIG. 5 based upon the shared file name 16 (e.g., ABCD) that is received. When the shared files 30 to be utilized are found, the shared file identifier 14 which is an index of the identifier information table 11 is returned back to the process C2.

When the shared files 30 to be used are not found, the first process A puts the shared files 30 to be used by the process C2 in an open state and, then, the process identifier "a" of the first process A, the file identifier 15 of the shared files 30 to be used by the process C2, e.g., to be locked, and the shared file name 16 are registered to the identifier information table 11, and the shared file identifier 14 is returned back to the process C2.

In FIG. 5, an index of the record is used as the shared file identifier 14. It is, however, also allowable to utilize the whole record as another case.

In further detail, when the process C2 executes the input/output process for the shared file 30, the shared file identifier 14 of the shared files 30 to be used is designated, and the request for the input/output process is sent to the first process A from the input/output process requesting unit 7-2 in the process C2 through the network L. At a moment when the request for input/output process is sent, the first process A makes a reference to the identifier information table 11 based upon the shared file identifier 14 to obtain a file identifier 15. By using the thus obtained file identifier 15, furthermore, the first process A requests from its input/output process requesting unit 7 the file managing unit 40 to execute the process for inputting/outputting the shared files 30, and returns the result back to the process C2.

When the process C2 executes the process to lock the shared files 30, on the other hand, the shared file identifier 14 of the shared files 30 to be processed is designated, and a request for locking process is sent to the second process B from the locking process requesting unit 8-2 in the process C2 through the network L. The request for locking process includes the name of a machine by which the request for locking process is made and the process identifier "c" of the process C in addition to the shared file identifier 14, and the kind and range of the locking process. In this case, it is also allowable to use the file identifier 15 in the machine M-2 instead of the process identifier "c".

Upon receiving the request for the locking process, the automatic identifier allocating unit 9 in the second process B seeks a record in which the machine name 113 by which the request for locking process is made is in agreement with the process identifier 13 while making reference to the automatic identifier allocating table 12 of FIG. 6. When this record is found, a substitute locking identifier 19 (e.g., "L") is obtained from this record. When this record is not found, the machine name 18 by which the request for locking process is made and the process identifier 13 are newly registered to the automatic identifier allocating table 12, and a given substitute locking identifier 19 that does not overlap the registered substitute locking identifier 19 is allocated. An index 17 or the like in the automatic identifier allocating table 12 can be utilized as the substitute locking identifier 19 of this type.

Next, the second process B seeks a record that corresponds to the shared file identifier 14 of the shared files 30 that are to be locked out of the identifier information table 11, and obtains "a" which is the process identifier 13 of the process by which the request for input/output process is made and the file identifier 15 of the shared files 30 that are to be locked.

Then, by using "a" which is the process identifier 13 of the process by which the request for input/output process is made, the file identifier 15 and the substitute locking identifier 19, the substitute locking process requesting unit 10 in the second process B requests the file managing unit 40 to lock the shared files 30 and sends the result back to the process C2.

In this case, as a locking process for the shared files 30, the offset and the length in the shared files 30 are designated to lock the shared files 30, and access by other processes is inhibited to the locked region.

As another locking process for the shared files 30, furthermore, access by other processes is inhibited to all the shared files 30 upon designation for opening of the shared files 30.

In the above-mentioned embodiment, the second process B uses "a", which is the process identifier 13 of the first process A, so that it appears that the first process A has requested the managing unit 40 to execute the locking process. Therefore, when the request for input/output process for the shared files 30 that have been locked by the second process B is sent again to the first process A and when the first process A requests the file managing unit 40 to execute the input/output process for the shared files 30, the input/output process for the shared files 30 is not limited by the locking process executed by the second process B.

Furthermore, when the process C3 in the machine M-3 requests the process for locking the shared files 30, the shared file identifier 14 of the shared files 30 to be locked is requested for the first process A on the machine M-1, and the second process B is requested to execute the locking process.

By utilizing the automatic identifier allocating table 12, the automatic identifier allocating unit 9 in the second process B allocates a substitute locking identifier 19 which is different from the substitute locking identifier 19 allocated to the process C2.

By using "a", which is the process identifier 13 of the first process A, file identifier 15 and substitute locking identifier 19, furthermore, the substitute locking process requesting unit 10 requests the file managing unit 40 to execute the locking process for the shared files 30. Thus, different substitute locking identifiers 19 are used in requesting the processes C2 and C3 to execute substitute locking processes and, hence, the file managing unit 40 executes exclusive control based upon the request for locking process between the process C2 and the process C3.

When another process C1 on the machine M-1 requests the process for locking the shared files 30, the locking process requesting unit 8-1 in the process C1 directly requests the file managing unit 40 to execute the process for locking the shared files 30. In this case, the process identifier "c" of the process C1 is used as the process identifier 13 and "0" is used as the substitute locking identifier 19. In this case, the process identifier "c" is used which is different from the process identifier "a" of the first process A and, hence, the file managing unit 40 executes exclusive control based upon the request for locking process among the process C1 on the machine M-1 and the processes C2, C3 on other machines.

Furthermore, even when there exist a plurality of first processes A requesting the file managing unit 40 to execute the input/output process for the shared files 30 in the above-mentioned embodiment, the second process B requests the process for locking the shared files 30 substituting for all first processes A. In this case, "a1", "a2", - - - are allocated in addition to "a" as the process identifiers of the plurality of first processes A, and "d, "e", - - - are allocated in addition to "c" as the process identifiers of the processes of other machines from which requests for the locking process are made.

FIG. 7 is a flow chart for explaining the operation of the automatic identifier allocating unit of FIG. 4A, and FIG. 8 is a flow chart for explaining the operation of the substitute locking process requesting unit of FIG. 4A.

These flow charts illustrate the operations of the automatic identifier allocating unit 9 and of the substitute locking process requesting unit 10 when the functions of the first process A and the second process B are realized by a CPU (central processing unit) in the computer system. A series of operations of the automatic identifier allocating unit 9 and the substitute locking process requesting unit 10 of FIG. 4A will now be described in detail in compliance with these flow charts.

First, as represented by a step S51 in FIG. 7, the automatic identifier allocating unit 9 in the second process B identifies the identifier of shared file, the name of the machine by which the request for locking process is made and the process identifier of a process by which request for locking process is made based upon the requests for locking process received from the processes on other machines.

Then, at steps S52 and S53, the automatic identifier allocating unit 9 retrieves the automatic identifier allocating table by using the name of machine from which the request for locking process is made and the process identifier of the process from which the request for locking process is made, in order to seek a record in which the shared file identifier, the name of the machine from which the request for locking process is made and the process identifier of the process from which the request for locking process is made, are in agreement.

When an objective record is found, a substitute locking identifier is obtained at a step S54 based upon this record.

When the objective record is not found, the machine name 18 by which the request for locking process is made and the process identifier 13 of the process by which the request for locking process is made are incorporated into the automatic identifier allocating table at a step S55, thereby to add a new record. At a step S56, furthermore, a given substitute locking identifier which does not overlap with the registered identifiers is allocated and is incorporated into the new record.

Thereafter, the substitute locking process requesting unit 10 retrieves the identifier data table by using the shared file identifier at the step S51 as represented by steps S61 and S62 of FIG. 8, in order to seek a shared file that is to be locked.

When a record corresponding to the shared file to be locked is not found, the substitute locking process requesting unit 10 sends an error message to the process by which the request for locking process is made to report that the shared file is not accessible now.

When the record corresponding to the shared file to be locked is found, a process identifier of the process by which the request for input/output process is made in the record and a file identifier of the shared file to be locked are obtained at a step S63.

Then, at a step S64, the substitute locking process requesting unit 10 requests the process for locking the shared file by using the substitute locking identifier, process identifier of the process by which request for input/output process is made and file identifier of the shared file to be locked.

Finally, the second process B informs the process by which the request for locking process is made of the result of the request for locking the shared file.

Operations of the automatic identifier allocating unit and of the substitute locking process requesting unit can be executed according to a program provided by the software of the computer system. Therefore, the substitute locking process by which the request for locking process is made can be efficiently executed without causing the hardware constitution to become complex in the apparatus for managing system resources.

First, according to the apparatus for managing system resources of the preferred embodiment of the present invention as described above, an executable unit such as process for receiving the requests for input/output process for the shared resources such as shared files and an executable unit such as process for receiving requests for locking process, are arranged being divided into independent executable units, and the latter executable unit requests the locking process to substitute for the former executable unit. Therefore, reduced burdens are born by the executable units. This makes it possible to efficiently execute the input/output process and the locking process, and to improve performance of the whole system.

Second, according to the apparatus for managing system resources of the preferred embodiment of the present invention, the identifier used for the apparatus for managing system resources is constituted by an executable unit identifier capable of uniquely identifying the executable unit that receives the request for input/output process and a file identifier capable of uniquely identifying the shared resources based on the executable unit. By retrieving these executable unit identifier and file identifier, therefore, it is allowed to efficiently process the requests of other optional executable units for locking the shared resources.

Third, according to the apparatus for managing system resources of the preferred embodiment of the present invention, the shared resources are locked by designating the offset and length in the shared resources, and the process for other executable units is locked concerning the locked region only. Therefore, other executable units are allowed to selectively use the remaining regions in the shared resources, making it possible to enhance the efficiency for using the shared resources.

Fourth, according to the apparatus for managing system resources of the preferred embodiment of the present invention, access by other executable units is inhibited to all the shared resources upon designation for opening the shared resources. By employing the locking process of this type, therefore, the contents of the shared resources are prevented from being destroyed by access from other executable units.

Fifth, according to the apparatus for managing system resources of the present invention, even when there exist a plurality of executable units that receive the requests for input/output process for the shared resources, the function for requesting the locking process is executed by an independent executable unit to substitute for these plurality of executable units. Therefore, the constitution for executing the substitute locking process does not become complex, the process for locking the shared resources is efficiently carried out by optional executable units, and the input/output process is efficiently carried out by a plurality of other executable units.

Sixth, according to the apparatus for managing system resources of the preferred embodiment of the present invention, a virtual identifier is automatically allocated to an executable unit that receives the requests for locking the shared resources, in order to receive the requests for locking the shared resources from the executable units on the computer systems other than the computer system having the shared resources. Due to the locking process, therefore, the exclusive control is accomplished among the executable unit on the computer system having the shared resources and the executable units on other computer systems connected to the network, making it possible to execute an equal locking process for the executable units on all computer systems connected to the network.

First, according to the method of managing system resources of the preferred embodiment of the present invention, furthermore, a process of the type for receiving the requests for input/output process for the shared resources and a process of the type for receiving requests for locking process, are divided into independent processes, and the latter process requests the locking process to substitute for the former process. Therefore, even after the locking process is executed by an optional process, the request for the input/output process is not limited by other optional processes, making it possible to efficiently execute the input/output process and the locking process for the shared resources.

Second, according to the method of managing system resources of the preferred embodiment of the present invention, furthermore, the identifier used for the substitute locking process is constituted by a process identifier capable of uniquely identifying the process of the type that receives the request for input/output process and a file identifier capable of uniquely identifying the shared resources based on the above-mentioned type of process. By retrieving these process identifier and file identifier, therefore, it is allowed to efficiently execute the process for locking the shared resources requested by other optional processes.

Third, according to the method of managing system resources of the preferred embodiment of the present invention, furthermore, the shared resources are locked by designating the offset and length in the shared resources, and other processes are locked for the locked region only. Therefore, other processes are allowed to access the remaining regions in the shared resources, and the shared resources can be efficiently used by plural kinds of processes or a plurality of processes.

Fourth, according to the method of managing system resources of the preferred embodiment of the present invention, furthermore, access by other processes is inhibited to all the shared resources upon designation for opening the shared resources. By executing the locking process of this type, therefore, the contents of the shared resources are prevented from being destroyed.

Fifth, according to the method of managing system resources of the of the preferred embodiment of the present invention, furthermore, even when there exist a plurality of processes of the type that receive the requests for input/output process for the shared resources, the function for requesting the locking process is executed by an independent process to substitute for these processes. This makes it possible to easily and efficiently execute the process for locking the shared resources requested by optional processes, and to execute the input/output process requested by a plurality of other processes without error.

Sixth, according to the method of managing system resources of the preferred embodiment of the present invention, furthermore, a virtual identifier is automatically allocated to a process of the type that receives the requests for locking the shared resources, in order to receive the requests for locking the shared resources from the processes on computer systems other than the computer system having the shared resources. It is therefore allowed to execute a flexible locking process by using exclusive control between the process on the computer having the shared resources and the processes on other computer systems connected to the network.

We claim:

1. An apparatus for managing system resources, comprising:

a resource managing unit, provided in a particular computer system among a plurality of computer systems connected to a network, directly manages shared resources that are used in common by a plurality of executable units on the plurality of computer systems, said resource managing unit including an input/output processing unit executing an input/output process for said shared resources concerning optional executable units and a locking processing unit executing a process for locking said shared resources concerning other optional executable units;

said particular computer system further comprising a processor having:

a first executable unit including an input/output process requesting unit which requests said input/output processing unit to execute the input/output process for said shared resources in response to optional executable units on said computer systems, and a second executable unit including a substitute locking process requesting unit which, by using an identifier for identifying said first executable unit, requests said locking processing unit to execute the process for locking said shared resources substituting for said first executable unit wherein, in order to receive requests for locking said shared resources from the executable units on a plurality of other computer systems, said second executable unit further includes an automatic identifier allocating unit to automatically allocate virtual identifiers to the requests for locking from the executable units on said other computer systems, and said second executable unit requests the process for locking said shared resources by using virtual identifiers automatically allocated to the requests for locking process from said other computer systems, in order to execute exclusive control among the optional executable units in all computer systems.

2. A managing apparatus according to claim 1, wherein said identifier comprises an executable unit identifier capable of uniquely identifying said first executable unit in said particular computer system and a file identifier capable of uniquely identifying said shared resources relying on said first executable unit, and said second executable unit requests the process for locking said shared resources by using said executable unit identifier and said file identifier.

3. A managing apparatus according to claim 1, wherein said process for locking said shared resources comprises designating the offset and length in said shared resources to thereby lock said shared resources and inhibiting access by other executable units to the locked region.

4. A managing apparatus according to claim 1, wherein said process for locking said shared resources comprises inhibiting access by other executable units to all the shared resources in response to a designation for opening said shared resources.

5. A managing apparatus according to claim 1, further comprising a plurality of said first executable units that request the input/output process for said shared resources, said second independent executable unit requesting the locking process substituting for all first executable units.

6. A method of managing system resources for executing an input/output process and a locking process for shared resources in a data storage unit, provided in a particular computer system among a plurality of computer systems connected to a network, the shared resources being used in common by a variety of processes on the plurality of computer systems, said method comprising, in the particular computer system:

a first process for processing the requests for input/output processing of said shared resources sent from optional processes on said plurality of computer systems;

a second process for processing the requests for locking said shared resources wherein the second process, using an identifier that identifies said first process, executes the process for locking said shared resources, substituting for the first process; and in order to receive requests for locking said shared resources from a plurality of other computer systems, said second process automatically allocates virtual identifiers to the requests for said locking process sent from the processes on said other computer systems, and the process for locking said shared resources is executed by using the thus allocated virtual identifiers, in order to execute exclusive control among the optional processes in all computer systems.

7. A managing method according to claim 6, wherein the process for locking said shared resources is executed by using, as the identifier, a process identifier capable of uniquely identifying said first process in said particular computer system and a file identifier capable of uniquely identifying said shared resources in said data storage unit relying upon said first process.

8. A managing method according to claim 6, wherein the process for locking said shared resources comprises designating the offset and length in said shared resources to thereby lock said shared resources and inhibiting access by other processes to the locked region.

9. A managing method according to claim 6, wherein the process for locking said shared resources comprises inhibiting access by other processes to all the shared resources in response to a designation for opening said shared resources.

10. A managing method according to claim 6, further comprising a plurality of said first processes that execute the input/output process for said shared resources, said second independent process executes the locking process substituting for all first processes.

* * * * *

UNITED STATES PATENT AND TRADEMARK OFFICE
CERTIFICATE OF CORRECTION

PATENT NO.: 5,894,555
DATED : April 13, 1999
INVENTOR(S): Tetsuya HARADA et al.

It is certified that error appears in the above-identified patent and that said Letters Patent is hereby corrected as shown below:

On the title page, [75] Inventors, change "Kahoka-gun" to --Ishikawa--.

In the drawings, in each of Figs. 1, 2A and 2B, please label as "PRIOR ART".

Col. 3, line 59, delete ",";
line 61, after "resources" (second occurrence) insert --,--;
line 62, after "files" insert --,--.

Col. 11, line 14, delete "."

Col. 12, line 44, change "113" to --18--.

Signed and Sealed this

Twenty-sixth Day of October, 1999

Attest:

Q. TODD DICKINSON

Attesting Officer

Acting Commissioner of Patents and Trademarks